(12) United States Patent
Hui et al.

(10) Patent No.: US 9,765,627 B2
(45) Date of Patent: Sep. 19, 2017

(54) ROOT LIGHTENING HOLES WITH SLOT

(71) Applicant: UNITED TECHNOLOGIES CORPORATION, Farmington, CT (US)

(72) Inventors: Kwan Hui, Manchester, CT (US); Michael A. Weisse, Tolland, CT (US); James Cosby, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 368 days.

(21) Appl. No.: 14/513,008

(22) Filed: Oct. 13, 2014

(65) Prior Publication Data

US 2015/0292336 A1 Oct. 15, 2015

Related U.S. Application Data

(60) Provisional application No. 61/927,855, filed on Jan. 15, 2014.

(51) Int. Cl.
| | | |
|---|---|---|
| *F01D 5/14* | (2006.01) | |
| *F01D 5/30* | (2006.01) | |
| *B23P 15/04* | (2006.01) | |
| *F02K 3/04* | (2006.01) | |
| *F04D 29/32* | (2006.01) | |

(52) U.S. Cl.
CPC .............. *F01D 5/147* (2013.01); *B23P 15/04* (2013.01); *F01D 5/30* (2013.01); *F01D 5/3007* (2013.01); *F02K 3/04* (2013.01); *F04D 29/322* (2013.01); *F04D 29/324* (2013.01); *F05D 2220/36* (2013.01); *F05D 2250/311* (2013.01); *F05D 2250/322* (2013.01); *F05D 2250/62* (2013.01)

(58) Field of Classification Search
CPC .......... F01D 5/147; F01D 5/16; F01D 5/3092; F04D 29/322; F04D 29/34
See application file for complete search history.

(56) References Cited

U.S. PATENT DOCUMENTS

| 4,566,827 A | * | 1/1986 | Neumueller | .......... B23C 5/1045 |
| | | | | 407/113 |
| 5,145,570 A | * | 9/1992 | Jusufbegovic | .......... C25C 3/125 |
| | | | | 204/279 |
| 5,407,326 A | * | 4/1995 | Lardellier | ............... F01D 5/147 |
| | | | | 416/232 |
| 5,431,542 A | | 7/1995 | Weisse et al. | |

FOREIGN PATENT DOCUMENTS

EP 1764476 3/2007

OTHER PUBLICATIONS

European Search Report for Application No. 15150578.1-1610; Dated: Jul. 16, 2015; 7 pgs.

* cited by examiner

*Primary Examiner* — Nathaniel Wiehe
*Assistant Examiner* — Brian O Peters
(74) *Attorney, Agent, or Firm* — Cantor Colburn LLP

(57) ABSTRACT

An airfoil includes a dovetail root having a base. A grooved slot is disposed in the base and a plurality of root lightening cavities is disposed in the grooved slot.

16 Claims, 4 Drawing Sheets

ROOT LIGHTENING HOLES WITH SLOT

CROSS-REFERENCE TO RELATED APPLICATION

This application is a non-provisional US patent application claiming priority under 35 USC §119(e) to U.S. provisional Ser. No. 61/927,855 filed on Jan. 15, 2014.

TECHNICAL FIELD

The subject matter of the present disclosure relates generally to gas turbine engines and, more particularly, relates to airfoils having root lightening holes used in gas turbine engines.

BACKGROUND

Gas turbine engines include a plurality of airfoils disposed circumferentially around the perimeter of a rotor disk. For optimum performance, it is ideal that the airfoils be light weight and stiff, because, during gas turbine engine operation, the rotating airfoils are often subject to a variety of different forces. For example, the airfoils typically experience centrifugal forces, aerodynamic forces and vibratory stimuli due to the rotation of the airfoils over the various operating speeds of the engine. One conventional way to reduce weight from the airfoil is to create pockets within the airfoil and to fill those pockets with a suitable light weight filler material for completing the aerodynamic profile of the airfoil. The pockets, however, reduce the stiffness of the airfoil. As such, the dovetail root and transition portion of the airfoil are often times solid in order to maintain stiffness in these critical areas.

A creative way to eliminate additional weight from the dovetail root and transition portion of the airfoil without negatively affecting stiffness much is to drill cavities into the base of the dovetail root. During assembly and disassembly of these airfoils from the gas turbine engine, however, the cavities in the base of the dovetail root cause scratching damage to the dovetail slot. Furthermore, the cavities in the base of the dovetail root have the potential to ingest water and other foreign objects during engine operation. If water gets into the cavities, the water has the potential to freeze and create an imbalance in the gas turbine engine due to the fact that not all the airfoils in the rotor disk may have ingested water. This potential imbalance can adversely affect the engine performance and must be avoided to maintain the efficiency of the engine.

Accordingly, there is a need to provide a light weight airfoil that maintains stiffness, avoids damaging other components of the gas turbine engine during assembly and disassembly, and prevents engine imbalance due to foreign object ingestion into lightening cavities of the airfoil.

SUMMARY

In accordance with an aspect of the disclosure, an airfoil is provided. The airfoil may include a dovetail root having a base. A grooved slot may be disposed in the base. A plurality of root lightening cavities may be disposed in the grooved slot.

In accordance with another aspect of the disclosure, the grooved slot extends substantially radially outwardly so as to be offset substantially radially from the base.

In accordance with yet another aspect of the disclosure, a plurality of plugs may be included so that each of the plurality of plugs may be disposed into a corresponding complementary cavity of the plurality of root lightening cavities.

In accordance with still yet another aspect of the disclosure, a corresponding complementary strip may be disposed within the grooved slot.

In further accordance with another aspect of the disclosure, each cavity of the plurality of root lightening cavities may include a counterbore.

In further accordance with yet another aspect of the disclosure, each cavity of the plurality of root lightening cavities may extend through the dovetail root and a transition portion of the airfoil and into an airfoil root of the airfoil.

In accordance with another aspect of the disclosure, a gas turbine engine is provided. The engine may include a rotor disk. A plurality of dovetail slots may be disposed around the perimeter of the rotor disk. Each airfoil of a plurality of airfoils may be include a dovetail root. Each dovetail root may include a base. Each dovetail root may be removably disposed within a complementary dovetail slot of the plurality of dovetail slots. A grooved slot may be disposed in each base. A plurality of root lightening cavities may be disposed in each grooved slot.

In accordance with still another aspect of the disclosure, each grooved slot may extend substantially radially outwardly so as to be offset substantially radially from the base.

In accordance with still yet another aspect of the disclosure, each plug of a plurality of plugs may be disposed into a corresponding complementary cavity of the plurality of root lightening cavities.

In further accordance with another aspect of the disclosure, each corresponding complementary strip of a plurality of corresponding complementary strips may be disposed within the grooved slot of each base.

In further accordance with yet another aspect of the disclosure, each root lightening cavity of the plurality of root lightening cavities may include a counterbore.

In further accordance with still yet another aspect of the disclosure, each root lightening cavity of the plurality of root lightening cavities may extend through the dovetail root and a transition portion of the airfoil and into an airfoil root of the airfoil.

In accordance with another aspect of the disclosure, a method of preventing a dovetail root of an airfoil from scratching a dovetail slot disposed in a gas turbine engine when the airfoil is removed from the engine is provided. The method entails forming a grooved slot in a base of the dovetail root. Another step may be forming a plurality of root lightening cavities in the base. Yet another step may be inserting a plug into each root lightening cavity of the plurality of root lightening cavities.

In accordance with yet another aspect of the disclosure, the method may include forming the grooved slot to extend substantially radially outwardly so as to be offset substantially radially from the base.

In accordance with still another aspect of the disclosure, the method may include disposing a corresponding complementary strip within the grooved slot to prevent foreign material from getting into the plurality of root lightening cavities.

In accordance with still yet another aspect of the disclosure, the method may include forming the plurality of root lightening cavities with a counterbore.

In further accordance with another aspect of the disclosure, the method may include forming the plurality of root lightening cavities to extend through the dovetail root and a transition portion of the airfoil and into an airfoil root of the airfoil.

In further accordance with still another aspect of the disclosure, the method may include the plurality of root lightening cavities being formed with a ball end mill to reduce stress concentration where the cavities terminate.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Throughout this specification the terms "downstream" and "upstream" are used with reference to the general direction of gas flow through the engine and the terms "axial", "radial" and "circumferential" are generally used with respect to the longitudinal central engine axis.

Figure 1:
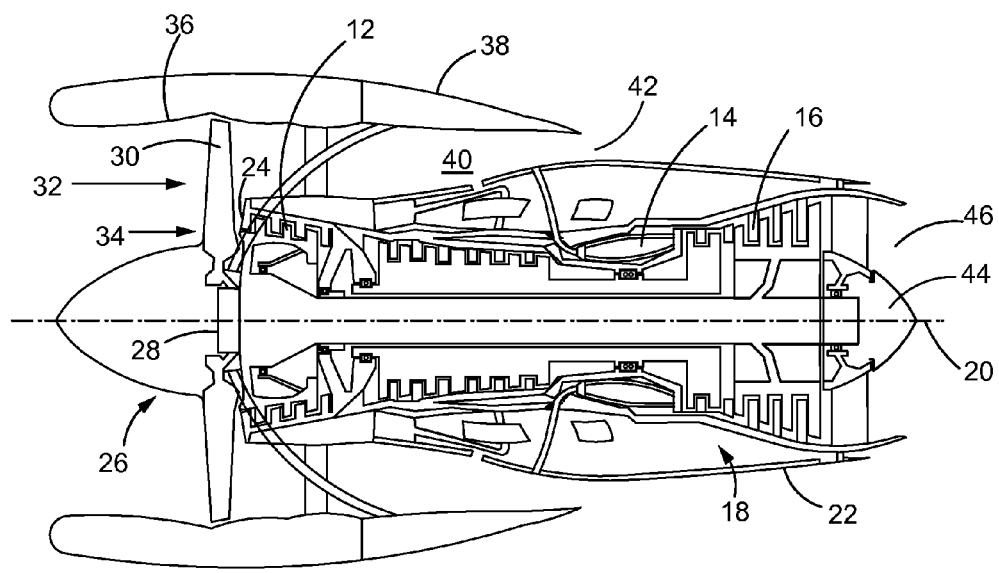
FIG. 1 is a side view of a gas turbine engine with portions sectioned and broken away to show details of the present disclosure.
Figure 2:
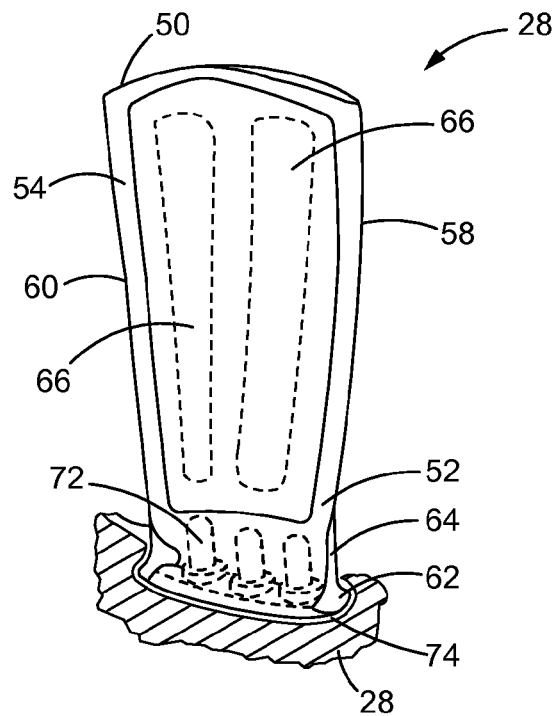
FIG. 2 is a perspective view of an airfoil, constructed in accordance with the teachings of this disclosure.
Figure 3:
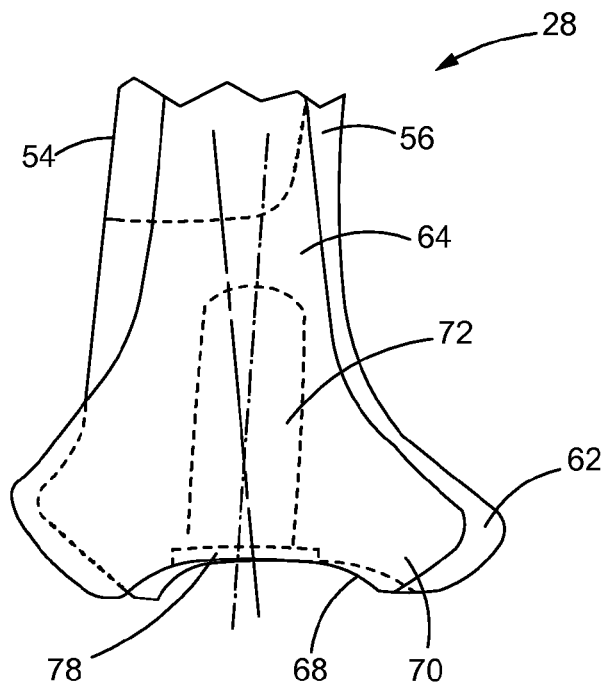
FIG. 3 is an enlarged side view of an airfoil, constructed in accordance with the teachings of this disclosure.
Figure 4:
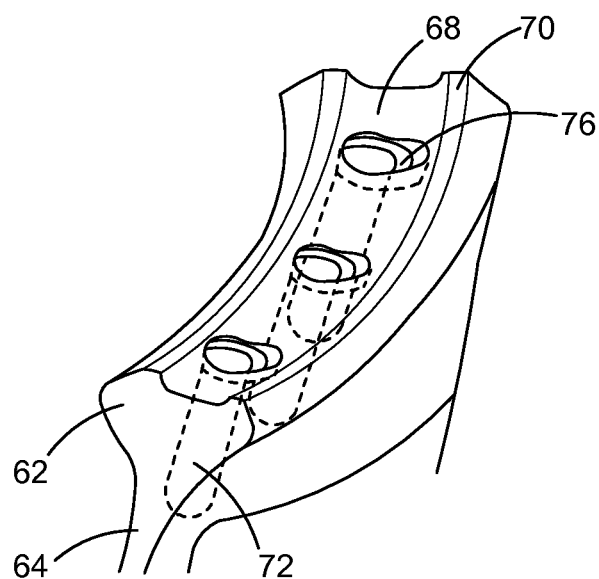
FIG. 4 is an enlarged perspective view of a base of an airfoil, constructed in accordance with the teachings of this disclosure.
Figure 5:
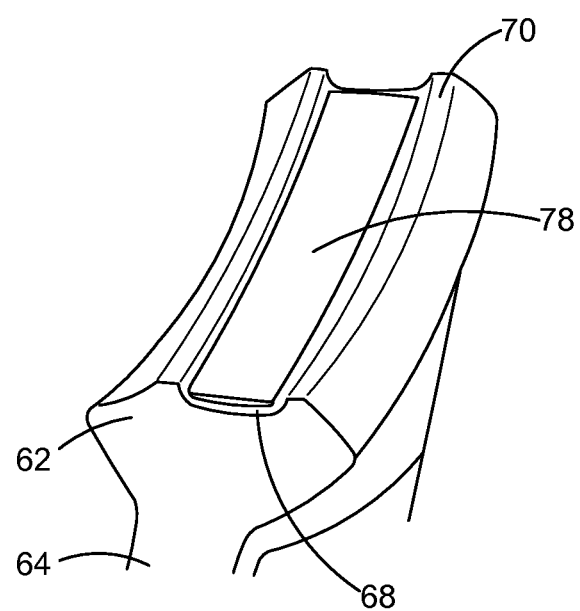
FIG. 5 is an enlarged perspective view of a base of an alternative airfoil, constructed in accordance with the teachings of this disclosure.

Referring now to FIG. 1, a gas turbine engine constructed in accordance with the present disclosure is generally referred to by reference numeral 10. The gas turbine engine 10 includes a compressor 12, a combustor 14 and a turbine 16. The serial combination of the compressor 12, the combustor 14 and the turbine 16 is commonly referred to as a core engine 18. The core engine 18 lies along a longitudinal central axis 20. A core engine cowl 22 surrounds the core engine 18.

Air enters compressor 14 at an inlet 24 and is pressurized. The pressurized air then enters the combustor 14. In the combustor 14, the air mixes with jet fuel and is burned, generating hot combustion gases that flow downstream to the turbine 16. The turbine 16 extracts energy from the hot combustion gases to drive the compressor 12 and a fan 26, which includes a rotor disk 28. A plurality of airfoils 30 is mounted circumferentially around the rotor disk 28. As the turbine 16 drives the fan 26, the airfoils 30 rotate so as to take in more ambient air. This process accelerates the ambient air 32 to provide the majority of the useful thrust produced by the engine 10. Generally, in some modern gas turbine engines, the fan 26 has a much greater diameter than the core engine 18. Because of this, the ambient air flow 32 through the fan 26 can be 5-10 times higher, or more, than the combustion air flow 34 through the core engine 18. The ratio of flow through the fan 26 relative to flow through the core engine 18 is known as the bypass ratio.

The fan 26 and core engine cowl 22 are surrounded by a fan cowl 36 forming part of a nacelle 38. A fan duct 40 is functionally defined by the area between the core engine cowl 22 and the nacelle 38. The fan duct 40 is substantially annular in shape so that it can accommodate the air flow produced by the fan 26. This air flow 32 travels the length of the fan duct 40 and exits downstream at a fan nozzle 42. A tail cone 44 may be provided at the core engine exhaust nozzle 46 to smooth the discharge of excess hot combustion gases that were not used by the turbine 16 to drive the compressor 12 and the fan 26.

Referring to FIGS. 2-5, each of the plurality of airfoils 28 may include a tip 50, an airfoil root 52, a pressure surface side 54, a suction surface side 56, a leading edge 58 and a trailing edge 60. The pressure surface side 54 and suction surface side 56 extend in a spanwise direction between the tip 50 and airfoil root 52. The surface sides 54, 56 also extend in a chordwise direction between the leading edge 58 and the trailing edge 60. Each of the plurality of airfoils 28 also includes a dovetail root 62, which is integrally joined to the airfoil root 52 by a transition portion 64.

Each of the airfoils 28 may include a plurality of pockets 66 disposed between the pressure surface side 54 and the suction surface side 56. The plurality of pockets 66 may be filled with a suitable light weight filler so that the filler is coextensive at its outer surface with either the pressure surface side 54 or the suction surface side 56 for providing an aerodynamically smooth and continuous contour with either of the surface sides 54, 56.

A grooved slot 68 is disposed at the base 70 of the dovetail root 62. The grooved slot 68 extends along the base 70 in the chordwise direction of the airfoil 28. Further, the grooved slot 68 extends radially outwardly so as to be offset substantially radially from the base 70. A plurality of root lightening cavities 72 is disposed at the grooved slot 68. Each cavity of the plurality of root lightening cavities 72 may have a substantially cylindrical shape extending substantially radially through the dovetail root 62 and may extend through the transition portion 64 and into the airfoil root 52. With the grooved slot 68 offset substantially radially from the base 70 of the dovetail root 62, the plurality of cavities 72 will not be in jeopardy of causing scratches on the dovetail slot 74 (shown in FIG. 2), disposed around the perimeter of the rotor disk 28, when the dovetail root 62 is removed from the dovetail slot 74. Although the diameter of each of the cavities 62 may be approximately equal, the depth of the cavities 62 may vary from one another. The number and shape of the cavities 72 are designed so as to maintain the stiffness and torsional strength of the airfoil 28.

Corresponding complementary plugs 76 may be disposed into each of the cavities 72 to prevent water from getting into the cavities 72, freezing and causing an imbalance due to the fact that not all of the airfoils 28 have ingested water. Similarly, the plugs 76 prevent other foreign objects from entering the cavities 72 and causing an imbalance or other damage. The plugs 76 may be molded or extruded from, but not limited to, polyurethane, epoxy or other foam or plastics. Alternatively, a corresponding complementary strip 78 may be disposed within the grooved slot 68 to prevent water from getting into the cavities 72. The strip 78 may be, but is not limited to, a polyimide or other suitable tape, a thin metallic strip or a thin plastic strip. The strip 78 may be used solely or in conjunction with the plugs 76.

In certain instances, a cavity 72 may not be truly radial, but may be offset at a slight angle. In order to facilitate the manufacturing of these offset cavities 72, counterbores 78 may be provided to help align the machine tooling used to create the offset cavities 72.

Figure 6:
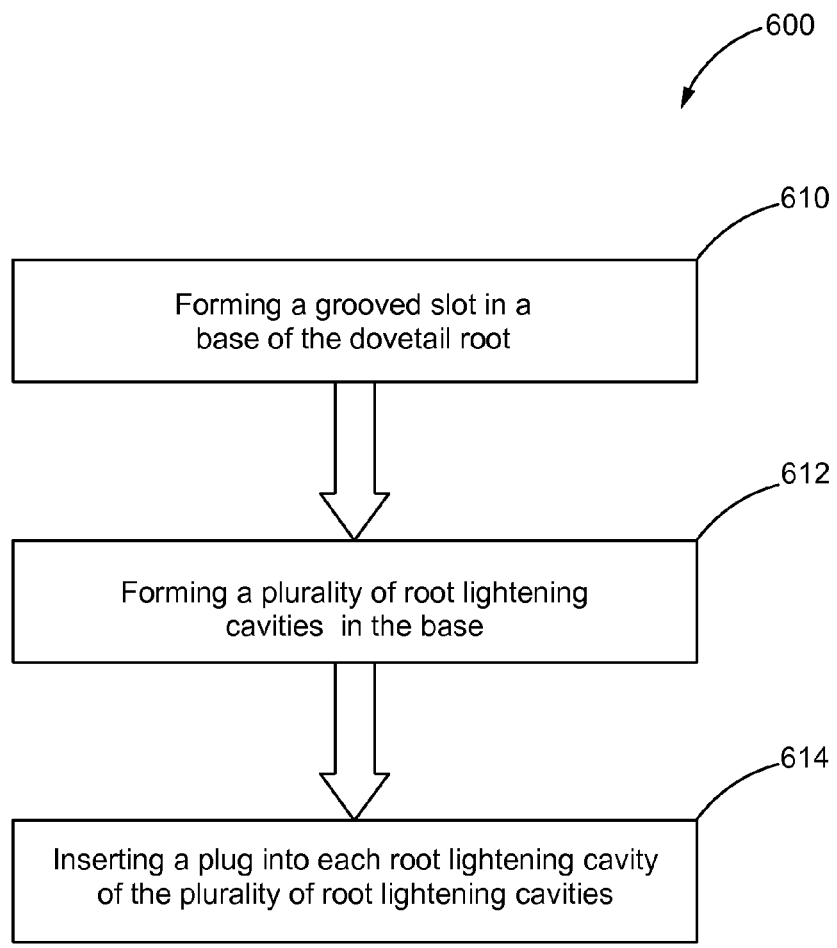
FIG. 6 is a flowchart illustrating a sample sequence of steps which may be practiced in accordance with the teachings of this disclosure.

FIG. 6 illustrates a flowchart 600 of a series of steps which may be performed to prevent a dovetail root of an airfoil from scratching a dovetail slot disposed in a gas turbine engine when the airfoil is removed from the engine. Box 610 shows the step of forming a grooved slot at a base of a dovetail root of an airfoil. The grooved slot may be formed to extend substantially radially outwardly so as to be offset substantially radially from the base. Another step, as illustrated in box 612, is forming a plurality of root lightening cavities in the base. Box 614 illustrates the step of inserting a plug into each root lightening cavity of the plurality of root lightening cavities. Another step may be to dispose a tape within the grooved slot to prevent foreign material from getting into the plurality of root lightening cavities. Further, the plurality of root lightening cavities may be formed with a counterbore. Yet another step may include forming the plurality of root lightening cavities to extend through the dovetail root and a transition portion of the airfoil and into an airfoil root of the airfoil. Moreover, another step may be to apply adhesive to each plug. The plurality of root lightening cavities may be formed with a ball end mill to reduce stress concentration where the cavities terminate.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth an airfoil which prevents scratching of a dovetail slot disposed in a gas turbine engine when the airfoil is removed from the engine. The teachings of this disclosure can be employed to reduce and eliminate damage to the dovetail slot during assembly and disassembly of the airfoil from the engine. Moreover, through the novel teachings set forth above, the potential for water and other foreign object and material ingestion into the root lightening cavities is prevented. Preventing foreign objects and materials from entering the root lightening cavities increases the engine performance by maintaining an equal balance between each airfoil of the plurality of airfoils. Furthermore, the present disclosure provides a lighter weight airfoil, which also increases engine performance.

What is claimed is:

1. An airfoil, the airfoil comprising:
   a dovetail root having a base;
   a grooved slot disposed in the base;
   a plurality of root lightening cavities extending from the grooved slot into the airfoil, wherein at least one of the plurality of root lightening cavities is angularly offset with respect to a radial direction of the airfoil;
   a plurality of plugs, each of the plurality of plugs disposed into a corresponding complementary cavity of the plurality of root lightening cavities each of the plurality of plugs being configured to prevent water from water from entering into the plurality of root lightening cavities when the plurality of plugs are disposed in the cavities;
   a counterbore located between the at least one of the plurality of root lightening that is angularly offset with respect to the radial direction of the airfoil and the grooved slot, wherein the counterbore is configured to facilitate an offset angle of the at least one of the plurality of root lightening cavities that is angularly offset with respect to the radial direction of the airfoil; and
   wherein the airfoil is configured to be removably secured to a rotor disk.

2. The airfoil of claim 1, wherein the grooved slot extends substantially radially outwardly so as to be offset substantially radially from the base.

3. The airfoil of claim 1, further including a corresponding complementary strip, the strip disposed within the grooved slot.

4. The airfoil of claim 1, wherein all of the plurality of root lightening cavities are angularly offset with respect to the radial direction of the airfoil and each cavity of the plurality of root lightening cavities includes a counterbore, wherein each counterbore is configured to facilitate an offset angle of each one of the plurality of root lightening cavities.

5. The airfoil of claim 1, wherein each cavity of the plurality of root lightening cavities extends through the dovetail root and a transition portion of the airfoil and into an airfoil root of the airfoil.

6. A gas turbine engine, the engine comprising:
   a rotor disk;
   a plurality of dovetail slots disposed around the perimeter of the rotor disk;
   a plurality of airfoils, each airfoil of the plurality of airfoils including a dovetail root, each dovetail root including a base, each dovetail root removably disposed within a complementary dovetail slot of the plurality of dovetail slots;
   a grooved slot disposed in each base; and
   a plurality of root lightening cavities extending from each grooved slot into each airfoil, wherein at least one of the plurality of root lightening cavities is angularly offset with respect to a radial direction of an airfoil;
   a plurality of plugs, each of the plurality of plugs disposed into a corresponding complementary cavity of the plurality of root lightening cavities each of the plurality of plugs being configured to prevent water from water from entering into the plurality of root lightening cavities when the plurality of plugs are disposed in the cavities;
   a counterbore located between the at least one of the plurality of root lightening that is angularly offset with respect to the radial direction of the airfoil and the grooved slot, wherein the counterbore is configured to facilitate an offset angle of the at least one of the plurality of root lightening cavities that is angularly offset with respect to the radial direction of the airfoil.

7. The gas turbine engine of claim 6, wherein each grooved slot extends substantially radially outwardly so as to be offset substantially radially from the base.

8. The gas turbine engine of claim 6, further including a plurality of corresponding complementary strips, each strip of the plurality of corresponding complementary strips disposed within the grooved slot of each base.

9. The gas turbine engine of claim 6, wherein all of the plurality of root lightening cavities are angularly offset with respect to the radial direction of the airfoil and each root lightening cavity of the plurality of root lightening cavities includes a counterbore, wherein each counterbore is configured to facilitate an offset angle of each one of the plurality of root lightening cavities.

10. The gas turbine engine of claim 6, wherein each root lightening cavity of the plurality of root lightening cavities extends through the dovetail root and a transition portion of the airfoil and into an airfoil root of the airfoil.

11. A method of preventing a dovetail root of an airfoil from scratching a dovetail slot disposed in a gas turbine engine when the airfoil is removed from the engine, comprising:

forming a grooved slot in a base of the dovetail root;

forming a plurality of root lightening cavities in the base, wherein at least one of the plurality of root lightening cavities is angularly offset with respect to a radial direction of an airfoil by using a counterbore located between the at least one of the plurality of root lightening that is angularly offset with respect to the radial direction of the airfoil and the grooved slot, wherein the counterbore is configured to facilitate an offset angle of the at least one of the plurality of root lightening cavities that is angularly offset with respect to the radial direction of the airfoil; and inserting a plug into each root lightening cavity of the plurality of root lightening cavities.

12. The method of claim 11, further including the step of forming the grooved slot to extend substantially radially outwardly so as to be offset substantially radially from the base.

13. The method of claim 11, further including the step of disposing a tape within the grooved slot to prevent foreign material from getting into the plurality of root lightening cavities.

14. The method of claim 11, further including the step of angularly offsetting all of the plurality of root lightening cavities with respect to the radial direction of the airfoil and forming all the plurality of root lightening cavities with a counterbore, wherein the counterbore is configured to facilitate an offset angle of all the plurality of root lightening cavities.

15. The method of claim 11, further including the step of forming the plurality of root lightening cavities to extend through the dovetail root and a transition portion of the airfoil and into an airfoil root of the airfoil.

16. The method of claim 11, wherein the plurality of root lightening cavities is formed with a ball end mill to reduce stress concentration where the cavities terminate.

* * * * *